(12) United States Patent
Chen et al.

(10) Patent No.: US 8,213,705 B2
(45) Date of Patent: Jul. 3, 2012

(54) METHODS FOR ACCURATE IDENTIFICATION OF AN EDGE OF A CARE AREA FOR AN ARRAY AREA FORMED ON A WAFER AND METHODS FOR BINNING DEFECTS DETECTED IN AN ARRAY AREA FORMED ON A WAFER (75) Inventors: Chien-Huei (Adam) Chen, San Jose, CA (US); Xiaoming Wang, San Jose, CA (US); Eugene Shifrin, Sunnyvale, CA (US); Tsung-Pao Fang, Milpitas, CA (US)

(73) Assignee: KLA-Tencor Technologies Corp., Milpitas, CA (US)

( * ) Notice: Subject to any disclaimer, the term of this patent is extended or adjusted under 35 U.S.C. 154(b) by 0 days.

(21) Appl. No.: 13/032,577

(22) Filed: Feb. 22, 2011

(65) Prior Publication Data
US 2011/0142327 A1 Jun. 16, 2011

Related U.S. Application Data (62) Division of application No. 11/680,152, filed on Feb. 28, 2007, now Pat. No. 7,894,659.

(51) Int. Cl.
*G06K 9/62* (2006.01)
(52) U.S. Cl. .................................................. 382/149
(58) Field of Classification Search .................. None
See application file for complete search history.

(56) References Cited

U.S. PATENT DOCUMENTS

| | | | |
|---|---|---|---|
| 4,579,455 A | 4/1986 | Levy et al. | |
| 4,845,558 A | 7/1989 | Tsai et al. | |
| 5,073,952 A | 12/1991 | Watanabe | |
| 5,521,987 A | 5/1996 | Masaki | |
| 6,104,835 A | 8/2000 | Han | |
| 6,650,779 B2 | 11/2003 | Vachtesvanos et al. | |
| 6,804,381 B2 | 10/2004 | Pang et al. | |
| 6,855,381 B2 | 2/2005 | Dietrich et al. | |

(Continued)

FOREIGN PATENT DOCUMENTS

EP 1630862 3/2006

(Continued)

OTHER PUBLICATIONS

International Search Report and Written Opinion for PCT/US08/55232 mailed on Jul. 4, 2008.

(Continued)

*Primary Examiner* — Brian P Werner
(74) *Attorney, Agent, or Firm* — Anne Marie Mewherter (57) ABSTRACT

Methods for identifying an edge of a care area for an array area formed on a wafer and/or for binning defects detected in the array area are provided. One method for identifying an edge of a care area for an array area formed on a wafer includes determining a value for a difference image as a function of position from a position known to be inside the array area to a position known to be outside of the array area. The method also includes identifying the position that is located closest to the inside of the array area and that has the value greater than a threshold as a position of the edge of the care area.

20 Claims, 3 Drawing Sheets

U.S. PATENT DOCUMENTS

| | | |
|---|---|---|
| 6,865,288 B1 | 3/2005 | Shishido et al. |
| 6,930,782 B1 | 8/2005 | Yi et al. |
| 6,947,587 B1 | 9/2005 | Maeda et al. |
| 7,065,239 B2 | 6/2006 | Maayah et al. |
| 7,142,992 B1 | 11/2006 | Huet et al. |
| 7,173,693 B2 * | 2/2007 | Shibata et al. ............. 356/237.1 |
| 7,570,796 B2 | 8/2009 | Zafar et al. |
| 7,676,077 B2 | 3/2010 | Kulkarni et al. |
| 7,925,072 B2 | 4/2011 | Chen et al. |
| 2002/0028013 A1 | 3/2002 | Sawa et al. |
| 2002/0052053 A1 * | 5/2002 | Ono et al. ........................ 438/12 |
| 2003/0076989 A1 | 4/2003 | Maayah et al. |
| 2004/0054432 A1 | 3/2004 | Simmons |
| 2004/0156539 A1 | 8/2004 | Jansson et al. |
| 2005/0062963 A1 | 3/2005 | Yoshida et al. |
| 2006/0062445 A1 | 3/2006 | Verma et al. |
| 2006/0280358 A1 | 12/2006 | Ishikawa |
| 2007/0280526 A1 | 12/2007 | Malik et al. |
| 2008/0067371 A1 * | 3/2008 | Kurihara et al. ............. 250/307 |
| 2011/0013825 A1 * | 1/2011 | Shibuya et al. ............... 382/149 |

FOREIGN PATENT DOCUMENTS

| | | |
|---|---|---|
| JP | 01086529 | 3/1989 |
| WO | 02/086804 | 10/2002 |
| WO | 2005/001456 | 1/2005 |

OTHER PUBLICATIONS

International Search Report and Written Opinion for PCT/US08/56212 mailed on Jul. 31, 2008.

* cited by examiner

METHODS FOR ACCURATE IDENTIFICATION OF AN EDGE OF A CARE AREA FOR AN ARRAY AREA FORMED ON A WAFER AND METHODS FOR BINNING DEFECTS DETECTED IN AN ARRAY AREA FORMED ON A WAFER

CROSS-REFERENCE TO RELATED APPLICATIONS

This application is a divisional of U.S. patent application Ser. No. 11/680,152 entitled "Methods for Accurate Identification of an Edge of a Care Area for an Array Area Formed on a Wafer and Methods for Binning Defects Detected in an Array Area Formed on a Wafer," filed Feb. 28, 2007, now U.S. Pat. No. 7,894,659 issued Feb. 22, 2011, both of which are incorporated by reference as if fully set forth herein.

BACKGROUND OF THE INVENTION

1. Field of the Invention

This invention generally relates to methods for identifying an edge of a care area for an array area formed on a wafer and methods for binning defects detected in an array area formed on a wafer. Certain embodiments relate to identifying edges of a care area for an array area formed on a wafer by expanding an original care area in x and y.

2. Description of the Related Art

The following description and examples are not admitted to be prior art by virtue of their inclusion in this section.

Fabricating semiconductor devices such as logic and memory devices typically includes processing a specimen such as a semiconductor wafer using a number of semiconductor fabrication processes to form various features and multiple levels of the semiconductor devices. For example, lithography is a semiconductor fabrication process that typically involves transferring a pattern to a resist covering a semiconductor wafer. Additional examples of semiconductor fabrication processes include, but are not limited to, chemical-mechanical polishing, etch, deposition, and ion implantation. Multiple semiconductor devices may be fabricated in an arrangement on a semiconductor wafer and then separated into individual semiconductor devices.

Wafer inspection using either optical or electron beam imaging are important techniques for debugging semiconductor manufacturing processes, monitoring process variations, and improving production yield in the semiconductor industry. With the ever decreasing scale of modern integrated circuits (ICs) as well as the increasing complexity of the manufacturing process, inspection is becoming more and more difficult.

The circuit layout printed in each die on a wafer always includes some areas that have repeating patterns; usually, such areas are DRAM, SRAM, or Flash memory. Advanced wafer inspection systems such as the 23xx systems that are commercially available from KLA-Tencor, San Jose, Calif. use a different inspection mode commonly referred to as "array mode" to inspect those areas as opposed to using die-to-die comparisons (which are commonly used in random mode inspection). For example, in array mode, the inspection system may be configured to adjust the zoom of an image sensor to achieve integer number of pixels in array cells and to then use cell-to-cell comparison of images generated by the image sensor to detect defects in the cells. Examples of such inspection systems are described in commonly assigned U.S. Pat. No. 4,845,558 to Tsai et al., which is incorporated by reference as if fully set forth herein. Array mode inspection can achieve much better sensitivity for defect detection in array areas than random mode inspection because array mode inspection avoids the noise of die-to-die variations and the residue error of image interpolation used in random mode.

To take advantage of the increased sensitivity provided by array mode inspection for array areas, the array areas of the dies on a wafer have to be defined manually or automatically during the step of care area setup. Examples of methods for attempting to automate the care area setup are described in U.S. Pat. No. 7,065,239 to Maayah et al., which is incorporated by reference as if fully set forth herein.

A shortcoming in the array mode performed by current inspection systems is that the borders of the defined array areas are not inspected. The borders are not inspected because the stage of any inspection system has some amount of positioning uncertainty. To account for this positioning uncertainty, the system may shrink the array areas by a distance, which is commonly referred to as the care area border (CAB), which could be as large as about 5 μm to about 10 μm for older systems and about 1.5 μm for newer systems. In either case, this reduction of the inspected areas by the care area border can cause a relatively large impact on the sensitivity entitlement provided by the system because in many cases critical defects of array areas are more likely to occur near the edges of the array areas.

Accordingly, it would be advantageous to develop methods for identifying a substantially accurate edge position of a care area for an array area formed on a wafer to increase the portion of the array area included in the care areas used for inspection thereby increasing the ability to detect critical defects occurring near edges of the array areas. It would also be advantageous to develop methods for binning defects detected in an array area formed on a wafer based on distances between the defects and one or more edges of the array area to thereby separate critical defects that occur near the edges of the array area from other defects detected in the array area.

SUMMARY OF THE INVENTION

The following description of various method embodiments is not to be construed in any way as limiting the subject matter of the appended claims.

One embodiment relates to a computer-implemented method for identifying an edge of a care area for an array area formed on a wafer. The method includes determining a value for a difference image as a function of position from a position known to be inside the array area to a position known to be outside of the array area. The method also includes identifying the position that is located closest to the inside of the array area and that has the value greater than a threshold as a position of the edge of the care area.

In one embodiment, the identifying step includes expanding an original care area in x. In another embodiment, the edge is a left edge of the care area. In one such embodiment, the method includes performing the determining step and the identifying step to identify a right edge of the care area. In an additional embodiment, the identifying step includes expanding an original care area in x, and the method includes expanding the original care area in y.

In some embodiments, the method includes determining the threshold from an average of the values for the difference image known to be inside the array area. In another embodiment, all steps of the method are performed during runtime of inspection of the wafer. In an additional embodiment, the method includes detecting defects in the array area by performing cell-to-cell comparisons in the care area. In a further embodiment, the method includes performing the method for multiple array areas on the wafer on an individual array area basis.

Each of the steps of the method embodiments described above may be performed as described further herein. Each of the embodiments of the method described above may include any other step(s) of any other method(s) described herein. The embodiments of the method described above may be performed using any of the systems described herein.

Another embodiment relates to a different computer-implemented method for identifying an edge of a care area for an array area formed on a wafer. The method includes determining a value for a difference image as a function of position from a position known to be inside the array area to a position known to be outside of the array area. The method also includes determining if a repeating pattern is formed at each of the positions. In addition, the method includes identifying the position that is located closest to the inside of the array area, that has the value greater than a threshold, and at which the repeating pattern is formed as a position of the edge of the care area.

In one embodiment, the identifying step includes expanding an original care area in y. In another embodiment, the edge is a top edge of the care area. In one such embodiment, the method includes performing the determining, steps and the identifying step described above to identify a bottom edge of the care area. In an additional embodiment, the identifying step includes expanding an original care area in y, and the method includes expanding the original care area in x.

In one embodiment, determining if the repeating pattern is formed at each of the positions is performed using a pattern recognition technique. In another embodiment, determining if the repeating pattern is formed at each of the positions is performed using a template matching technique.

In some embodiments, the method includes determining the threshold from an average of the values for the difference image known to be inside the array area. In another embodiment, all steps of the method are performed during runtime of inspection of the wafer. In an additional embodiment, the method includes detecting defects in the array area by performing cell-to-cell comparisons in the care area. In a further embodiment, the method includes performing the method for multiple array areas on the wafer on an individual array area basis.

Each of the steps of the method embodiments described above may be performed as described further herein. Each of the embodiments of the method described above may include any other step(s) of any other method(s) described herein. The embodiments of the method described above may be performed using any of the systems described herein.

An additional embodiment relates to a computer-implemented method for binning defects detected in an array area formed on a wafer. The method includes determining distances between positions of the defects and an edge of the array area. The method also includes binning the defects in groups such that the distances determined for the defects in each of the groups are at least similar.

In one embodiment, the distances include distances in an x direction and a y direction. In one such embodiment, the binning step includes binning the defects in the groups such that the distances in the x direction determined for the defects in each of the groups are at least similar and such that the distances in the y direction determined for the defects in each of the groups are at least similar. In another embodiment, the method includes selecting the distances associated with each of the groups such that the binning step includes binning the defects into the groups such that each of the groups includes only nuisance defects or only defects of interest.

Each of the steps of the computer-implemented method embodiment described above may be performed as described further herein. Each of the embodiments of the method described above may include any other step(s) of any other method(s) described herein. The embodiments of the method described above may be performed using any of the systems described herein.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As used herein, the term "wafer" generally refers to substrates formed of a semiconductor or non-semiconductor material. Examples of such a semiconductor or non-semiconductor material include, but are not limited to, monocrystalline silicon, gallium arsenide, and indium phosphide. Such substrates may be commonly found and/or processed in semiconductor fabrication facilities.

A wafer may include one or more layers formed upon a substrate. For example, such layers may include, but are not limited to, a resist, a dielectric material, and a conductive material. Many different types of such layers are known in the art, and the term wafer as used herein is intended to encompass a wafer including all types of such layers.

One or more layers formed on a wafer may be patterned. For example, a wafer may include a plurality of dies, each having repeatable patterned features. Formation and processing of such layers of material may ultimately result in completed devices. Many different types of devices may be formed on a wafer, and the term wafer as used herein is intended to encompass a wafer on which any type of device known in the art is being fabricated.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals.

The embodiments described herein generally relate to methods for enhancing the detection and binning of defects in repeating microstructures for semiconductor wafer inspection applications. One embodiment relates to a computer-implemented method for identifying an edge of a care area for an array area formed on a wafer. Identifying the edge of the care area and thereby expanding an original care area advantageously increases the portion of the array area that is included in the area of the wafer inspected during array mode inspection. In particular, expanding the original care area as described herein includes searching for the "true" edges of array areas and therefore expanding care areas to reduce the loss of inspected array areas and therefore detected defects due to un-inspected areas in care area borders.

The methods described herein may include expanding an original care area in x. For example, the method may include using an array edge search algorithm to find an array area edge in the x direction. The input to the algorithm may include, but is not limited to, an image frame, the care areas for the image, the array cell size, and the care area border. The image frame may be acquired in any suitable manner (e.g., by the methods or systems described herein or from another method or system that generated the image frame). The care areas for the image, the array cell size, and the care area border may be acquired in any suitable manner (e.g., from an inspection recipe that includes instructions for performing array mode inspection of the array areas on the wafer) or may be determined by the embodiments described herein (e.g., based on the design for the array areas, information about one or more processes performed on the wafer prior to inspection, information about the inspection system, any other relevant information, or some combination thereof). In one embodiment, the care areas may be determined as described in commonly assigned U.S. patent application Ser. No. 11/683,696 by Chen et al., filed Mar. 8, 2007, published as U.S. Patent Application Publication No. 2008/0219545 on Sep. 11, 2008, which is incorporated by reference as if fully set forth herein.

Figure 1:
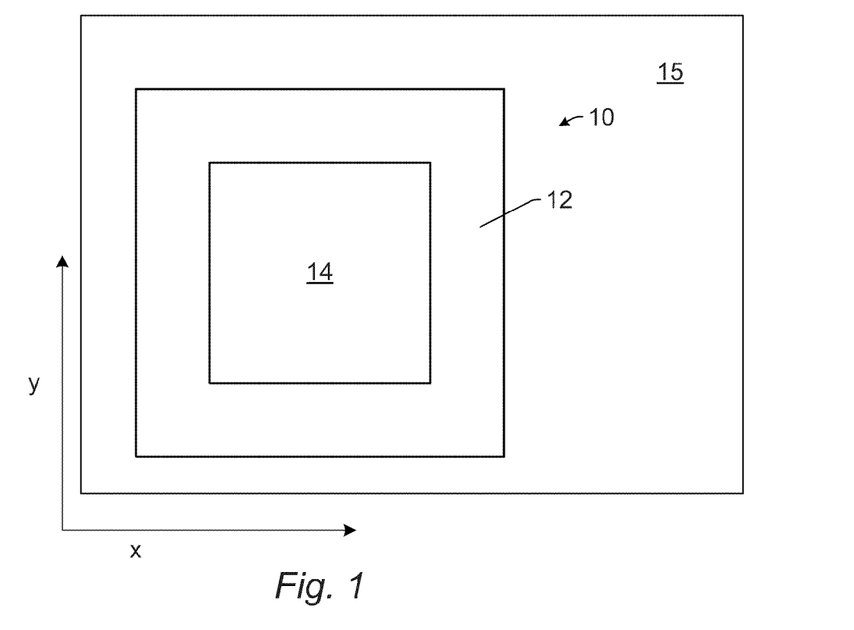
FIG. 1 is a schematic diagram illustrating a top view of one example of an original care area for an array area within an image of a wafer.

The method may include reducing or "shrinking" an original care area by a care area border. For example, as shown in FIG. 1, original care area 10 may be shrunk by care area border 12 to produce shrunken care area 14. As further shown in FIG. 1, shrinking the original care area by the care area border includes moving each of the outer edges of the original care area toward the center of the original care area. In this manner, shrinking the original care area may include shrinking the original care area in both directions in both x and y. Therefore, as shown in FIG. 1, the care area border surrounds the shrunken care area.

The dimensions of the care area border may include any appropriate dimensions for care area borders and may vary depending on, for example, the inspection system that will be used for array mode inspection of the array areas on the wafer, dimensions of the array areas, any other relevant information, or some combination thereof. For example, the care area border may have a width (from an outer edge of the shrunken care area to an outer edge of the original care area) of about 1.5 µm to about 10 µm. In addition, the care area border may or may not have different dimensions in the x and y directions.

As described further herein, the care area border dimensions may be selected to ensure that after the original care area is shrunk by the care area border, the shrunken care area will include only the array area. In particular, to compensate for positional uncertainty of the inspection system used to perform array mode inspection of the wafer, often the shrunken care area is smaller than the actual array area, and some portion of the array area may not be inspected. Therefore, using such shrunken care areas for array mode inspection is disadvantageous since some portion of the array areas will not be inspected (e.g., portions of the array areas relatively close to edges of the array areas and some critical defects of interest (DOIs) may be located near the edges of the array areas. As such, using the shrunken care areas for array mode inspection not only decreases the accuracy of inspection but also decreases the accuracy of inspection for some critical defects.

However, in the embodiments described further herein, image 15 shown in FIG. 1 in which original care area 10 is located may be used to determine (substantially accurately) the actual edges of the array areas. For example, the embodiments described herein may use image processing techniques to identify the "true" care areas for the array areas. In particular, the embodiments described herein may be performed using the same image frame that is used for defect detection. These actual edges of the array areas may then be used to define the areas of the wafer (or the care areas) to be inspected during array mode inspection. As such, the actual edges of the array areas determined as described herein may be used to increase the accuracy of array mode inspection, particularly for some types of critical defects.

The following steps of the method will be described for expanding the original care area in x by identifying the actual right edge of the array area and therefore the actual right edge of the care area. The method may include using image 15 shown in FIG. 1 to generate difference image 17 shown in FIG. 2. In particular, image 15 and a shifted image (e.g., image 15 shifted by one cell size in the x direction) may be used generate difference image 17.

Figure 2:
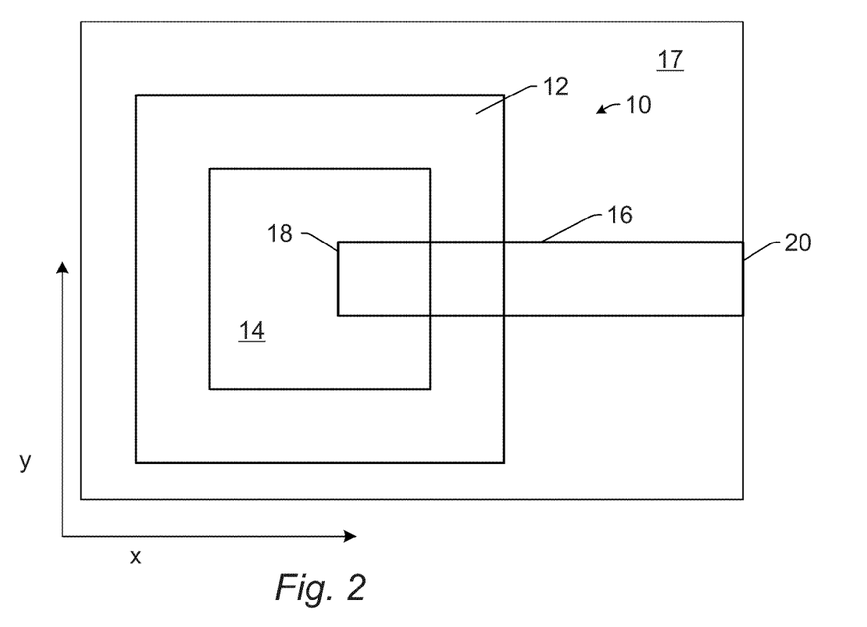
FIG. 2 is a schematic diagram illustrating a top view of the original care area of FIG. 1 within a difference image corresponding to the image of FIG. 1 with one embodiment of a region extending from a position known to be inside of the array area to a position known to be outside of the array area, which can be used to expand the original care area in x.

To identify an edge of the care area, the method may include defining a region or a "horizontal strip" in the difference image. The region may be centered in y. For example, as shown in FIG. 2, region 16 may be defined in difference image 17. As further shown in FIG. 2, region 16 is approximately centered in y by being approximately centered in the y dimension of original care area 10. In addition, the region extends from position 18 known to be inside of the array area to position 20 known to be outside of the array area. The positions inside of the array area and outside of the array area may be determined in any suitable manner. For example, the scanned (or imaged) care area (e.g., the shrunken care area) can be used as the known array area, and the position inside of the array area may be selected to be a position with the scanned care area (e.g., the shrunken care area). As shown in FIG. 2, region 16 may extend from a position within shrunken care area 14 to a position at the edge of image 17. However, region 16 may not necessarily extend to the edge of the image.

Instead, region 16 may extend to a position known to be outside of the array area (e.g., outside of original care area 10) within image 17.

The region may have any suitable dimension in the y direction. For example, the dimension of the region in the y direction may be a predetermined or fixed height (e.g., a default may be about 32 pixels) for the region. Preferably, the predetermined or fixed height is selected such that the region includes enough information about the difference image in the y direction such that the array area edge and therefore the care area edge can be identified as described herein. For example, an appropriate dimension of the region in y may be equal to or greater than about 2 times the period of the array patterned features in y.

The method may also include determining an average of the values for the difference image known to be inside of the array area. For example, the method may include determining an average value (or some variation other than average such as minimum or median) for the difference image known to be inside of the array area. In one such embodiment, the method includes selecting two or more (e.g., three) horizontal stripes (or regions) such as that described herein. The method may also include determining a stripe of the median values of the two or more horizontal stripes. Determining the stripe of the median values for the two or more horizontal stripes may be advantageous to reduce any effects of defects on the stripe of the median values. In addition, the method may include projecting the median stripe on the x axis. The method may further include determining a mean and standard deviation (or any other measure of variability) for the projection, which can be used to determine a threshold as described further herein.

In some embodiments, the method includes determining a threshold from the average of the values for the difference image known to be inside of the array area. For example, the method may include determining a threshold value, which can be used in the identifying step described further herein, using the average of the values for the difference image or any other attributes of the difference image known to be inside of the array area described herein. The threshold value may be selected to be higher than the average value for the difference image. In one particular example, the threshold may be set equal to about three times the average of the values for the difference image known to be inside of the array area. In addition, the threshold value may be selected based on noise in the input (e.g., images) to the algorithm. The noise may be determined using, for example, cell-to-cell comparisons in the images. The noise may be determined using the cell-to-cell comparisons in any manner known in the art. For example, if the threshold is determined from the average value for the difference image, then the noise may be determined from the standard deviation of the difference. Therefore, the embodiments described herein may use a variable threshold that is determined based on the difference image generated for the actual array area for which the care area is being identified. In this manner, the array edge detection algorithm described herein is more adaptive since it uses a variable threshold as opposed to a fixed threshold.

The method includes determining a value for the difference image as a function of position from a position known to be inside the array area to a position known to be outside of the array area. For example, a value for difference image 17 in region 16, which extends from a position known to be inside the array area to a position known to be outside of the array area, shown in FIG. 2 may be determined. In this manner, the value for the difference image may be determined as a function of position across the x dimension of the region. The value may be an average for values of the difference image across the height (e.g., the dimension of the region in the y direction) of the region at each of the positions.

Figure 3:
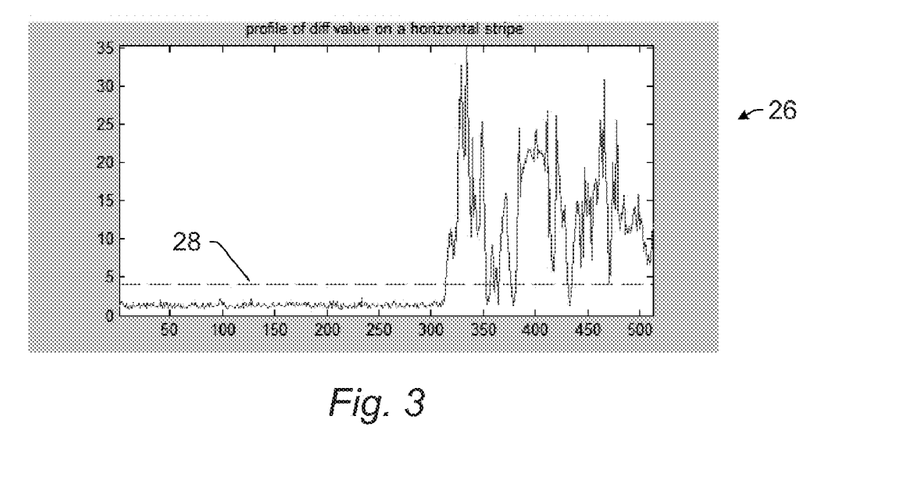
FIG. 3 is a schematic diagram of one embodiment of a plot of a value for a difference image as a function of position from a position known to be inside the array area to a position known to be outside of the array area, which can be used to expand the original care area in x.

In one such embodiment, the determining step includes determining a profile of the values for the difference image across the horizontal strip by taking the average over the height of the strip. In other words, as shown in FIG. 3, the determining step may include generating plot 26. Plot 26 may include the average of the values for the difference image over height plotted on the y axis as a function of position from a position known to be inside the array area to a position known to be outside of the array area on the x axis. Although the method may include generating a plot of the profile, the profile may be determined and/or expressed in any other suitable manner. In this manner, the determining step may include determining a profile of cell-to-cell differences for identifying the array area edge and therefore the care area edge as described further herein. The profile may also be determined using any other results of the determining step described herein.

The method also includes identifying the position that is located closest to the inside of the array area and that has the value greater than a threshold as a position of the edge of the care area. The identifying step may include using one of the difference profiles described above to identify the array area edges and therefore the edges of the care area. For example, as shown in FIG. 3, threshold 28 may be compared to plot 26. Threshold 28 may be determined as described herein. In this manner, if the edge being identified in the method is the right edge, the identifying step may include, starting from the position known to be inside of the array area, searching for the first jump when the profile difference value is greater than the threshold. This position may be used to determine the position of the right edge of the care area. For example, the position of the "true" boundary of the array area in x may be determined to be equal to the position at the jump described above plus the cell size. In this manner, the identifying step may effectively include searching for the discontinuity in the array pattern corresponding to the edge of the array area. The steps described above may be performed to determine the left edge of the expanded care area.

The difference image values described above may be used to determine an edge of an array area and therefore the care area as described herein since the difference image values will be different for portions of the region that include array patterns formed in the array area and for portions of the region that do not include the array patterns. For instance, for portions of the region that are located in the array area, the values for the difference image will be relatively low. In other words, subtracting an original image from a shifted image, both of which are acquired in the array area, will result in the array patterns in the original and shifted images effectively canceling each other thereby producing a value for a difference image that is substantially close to zero. In contrast, portions of the regions that are not located in the array areas wilt not contain such array patterns. Therefore, the values for the difference image for these portions of the region may be relatively high since the shifted image and the original image will not effectively cancel each other out.

As a result, the difference image values can be used as described herein to differentiate between portions of the region that contain array patterns and portions of the region that do not. In particular, the values of the difference image are expected to be about zero within the array area and jump to high numbers outside of the array area. In addition, the value of the difference image that is higher than the threshold and closest to the position known to be inside of the array area defines the edge of the array area and therefore the care area.

Therefore, if more than one of the values for the difference image included in the region are determined to have values above the threshold, the value that is located closest to the position known to be inside the array area may be determined to be the position of the edge of the array area and therefore the care area. As such, the position of the edge of the array area can be determined from the position corresponding this value. In addition, the position of the edge of the care area can be determined to be the position of the edge of the array area.

In one embodiment, as described further above, the identifying step includes expanding an original care area in x. For example, the method may include using an array edge search algorithm to perform the steps of the method described above to identify an array area edge in the x direction and thereby to identify an edge of a care area in the x direction.

As described above, the method may include identifying a right edge of the care area. In another embodiment, the edge is a left edge of the care area. For example, the method described above may be performed on the other side of the original care area within the difference image. In one such embodiment, the method includes performing the determining step and the identifying step to identify a right edge of the care area. In this manner, the method may include using the array edge search algorithm to find both array area edges and therefore both edges of the care area in the x direction.

In an additional embodiment, the identifying step includes expanding an original care area in x, and the method includes expanding the original care area in y. Expanding the care area in x may be performed as described herein. In addition, expanding the care area in y may be performed as described further herein. In some such embodiments, the method may include using the array edge search algorithm to find both array area edges and therefore both edges of the care area in both the x and y directions.

The positions of the array area edges and therefore the care area edges in the x and y directions may be determined in inspection system coordinates. In addition, or alternatively, the positions of the array area edges and therefore the care area edges may be determined in wafer space (e.g., with reference to the wafer itself) in the x and y directions.

In another embodiment, all steps of the method are performed during runtime of inspection of the wafer. In this manner, the method may include searching for the "true" edges of array areas and therefore care areas during an inspection run. In particular, the methods described herein may be executed during an inspection run. The methods may be executed during inspection runtime using software or a system configured as described further herein. In addition, the methods described herein may be performed at any suitable time during the inspection run.

In a further embodiment, the method includes performing the method for multiple array areas on the wafer on an individual array area basis. For example, the method may include using the array edge search algorithm to process one care area at a time. In particular, the steps of the method described herein may be performed for each array area formed on the wafer. In this manner, the care area for each array area may be determined independently and sequentially. As such, substantially an entirety of each array area on the wafer may be inspected during array mode inspection thereby providing relatively high defect detection accuracy, particularly for relatively critical defects in array areas located near the edges of the array areas.

In an additional embodiment, the method includes detecting defects in the array area by performing cell-to-cell comparisons in the care area. For example, in some embodiments, the method includes shifting an image frame acquired in the care area by one cell size in x and determining the cell-to-cell difference image. Since the embodiments described herein can substantially accurately identify the edge of the array area and therefore the care area, the inspected area of the array area is increased. In particular, the edges of the care areas determined as described herein can expand the original care area by about the twice the care area border. In addition, the care areas determined as described herein will have in effect zero care area borders. In this manner, the method enables inspection systems to inspect substantially an entirety of each array area formed in a die in array mode. As such, the embodiments described herein will be able to detect more defects in the array areas than other previously used array mode inspection methods and systems. In particular, the method embodiments described herein enable substantially no loss of DOI detection due to the care area border. Furthermore, the embodiments described herein will be able to detect more critical defects that are more likely to occur on or near the care area border.

Each of the embodiments of the method described above may include any other step(s) of any other method(s) described herein. The embodiments of the method described above may be performed using any of the systems described herein.

Another embodiment relates to a different computer-implemented method for identifying an edge of a care area for an array area formed on a wafer. The methods described further herein include expanding an original care area in y. For example, the method may include using an array edge search algorithm to find an array area edge and therefore a care area edge in the y direction. The array edge search algorithm used to find the array area edge and therefore the care area edge in the y direction may or may not be included in or combined with the array edge search algorithm described above used to find the array area edges and therefore the care area edges in the x direction.

Input to the algorithm for finding the array area edge and therefore the care area edge in the y direction may include any of the input described above. In this manner, the embodiments described herein may use image processing techniques to identify the "true" care areas. In particular, the embodiments described herein may be performed using the same image frame that is used for defect detection.

This embodiment of the method may include reducing or "shrinking" an original care area by a care area border. This step may be performed as described herein and shown in FIG. 1. The original care area, the care area border, and the shrunken care area may be configured as described herein.

The following steps of the method will be described for expanding the original care area in y by identifying the actual top edge of the array area and therefore the care area. The method may include determining the cell size in the y direction. For example, the method may include selecting two or more (e.g., three) vertical stripes (or regions) such as those described herein. The method may also include determining a stripe of the median values of the two or more vertical stripes. Determining the stripe of the median values for the two or more vertical stripes may be advantageous to reduce any effects of defects on the stripe of the median values. In addition, the method may include selecting two or more (e.g., three) templates (to avoid horizontal page breaks in the templates) in the median stripe and computing the normalized cross correlation (NCC) profile. For array areas with horizontal page breaks or unsuppressed patterns there may be no well defined period so the correlation template size may be adaptive. Such a method may also include sorting all NCC buffers and selecting the median as a cell size. The method may further include selecting the minimal of the three medians to be used as the minimal cell size in further calculations. After the cell size has been determined in the y direction, the same general approach described above for the x direction can be applied to identify the array area edge in the y direction. One difference between the approaches in the x and y directions is that the cell size in the y direction may be a non-integer so the shift used to generate the difference image may require interpolation, which may be performed in any suitable manner.

Figure 4:
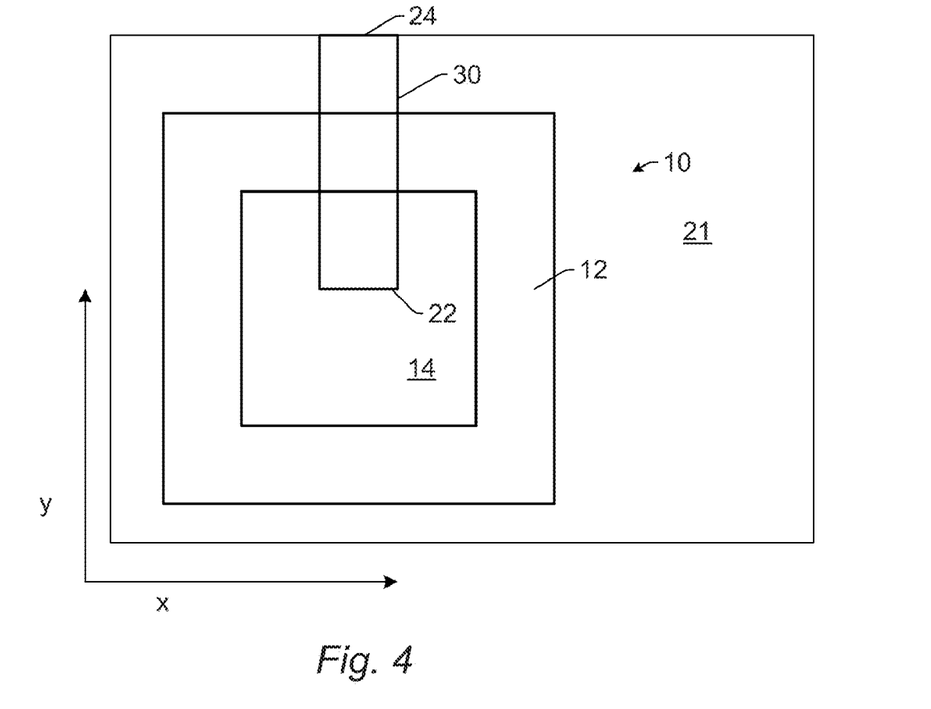
FIG. 4 is a schematic diagram illustrating a top view of the original care area of FIG. 1 within a difference image corresponding to the image of FIG. 1 with one embodiment of a region extending from a position known to be inside of the array area to a position known to be outside of the array area, which can be used to expand the original care area in y.

The method may include using image 15 shown in FIG. 1 to generate difference image 21 shown in FIG. 4. In particular, image 15 and a shifted image (e.g., image 15 shifted by one cell size in the y direction, which may be determined as described above) may be used generate difference image 21.

To identify an edge of the care area, the method may include identifying a region or a "vertical strip" in the difference image. The region may be centered in x. For example, as shown in FIG. 4, region 30 may be defined in image 21. As further shown in FIG. 4, region 30 is approximately centered in x by being approximately centered in the x dimension of original care area 10. In addition, as shown in FIG. 4, region 30 extends from position 22 known to be inside the array area to position 24 known to be outside of the array area. The positions inside of the array area and outside of the array area may be determined in any suitable manner. For example, the scanned (or imaged) care area (e.g., the shrunken care area) can be used as the known array area, and the position inside of the array area may be selected to be a position with the scanned care area (e.g., the shrunken care area). As shown in FIG. 4, region 30 may extend from a position within shrunken care area 14 to a position at the edge of image 21. However, region 30 may not necessarily extend to the edge of the image. Instead, region 30 may extend to a position known to be outside of the array area (e.g., outside of original care area 10).

The region may have any suitable dimension in the x direction. For example, the dimension of the region in the x direction may be a predetermined or fixed width (e.g., a default width of about 32 pixels) for the region. Preferably, the predetermined or fixed width is selected such that the region includes enough information about the difference image in the x direction such that the array area edge and therefore the edge of the care area can be identified as described further herein. For example, an appropriate dimension in x for the region may be equal to or greater than about 2 times the period of the array patterned features in the x direction.

The method may also include determining an average of the values for the difference image known to be inside of the array area. For example, the method may include determining an average of the values (or some variation other than average such as minimum or median) for the difference image known to be inside of the array area.

In some embodiments, the method includes determining a threshold from the average of the values for the difference image known to be inside of the array area. The threshold may be determined as described further herein. Therefore, these embodiments also use a variable threshold that is determined based on the difference image generated for the actual array area for which the care area is being identified. In this manner, the array edge detection algorithm described herein is more adaptive since it uses a variable threshold as opposed to a fixed threshold.

The method includes determining a value for the difference image as a function of position from a position known to be inside the array area to a position known to be outside of the array area. For example, a value for difference image 21 in region 30, which extends from a position known to be inside the array area to a position known to be outside of the array area, shown in FIG. 4 may be determined. In this manner, the value for the difference image may be determined as a function of position across the y dimension of the region. The value may be an average for values of the difference image across the width (e.g., the dimension of the region in the x direction) of the region at each of the positions.

Figure 5:
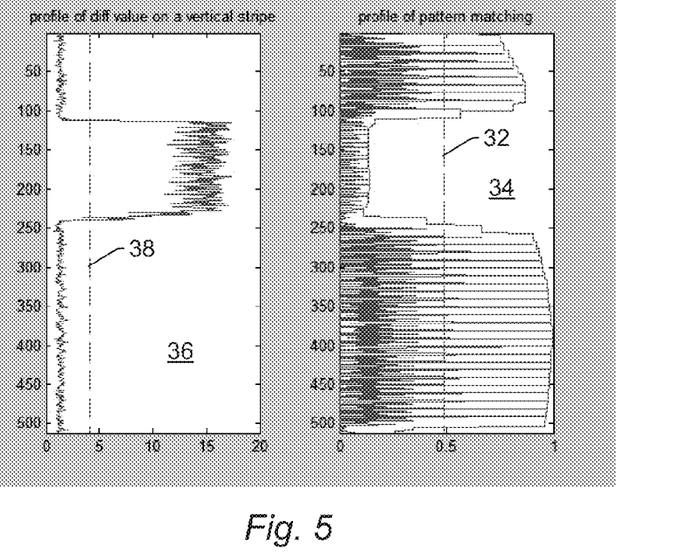
FIG. 5 is a schematic diagram of one embodiment of a plot of a value for a difference image as a function of position from a position known to be inside the array area to a position known to be outside of the array area and a plot of a repeating pattern profile, which can be used to expand the original care area in x.

In one such embodiment, the determining step includes determining a profile of the difference values across the vertical strip by taking the average over the width of the strip. In other words, as shown in FIG. 5, the determining step may include generating plot 36. Plot 36 may include the values determined for the difference image as described above plotted on the x axis as a function of position (from the position known to be inside the array area to a position known to be outside of the array area) corresponding to the values on the y axis. Although the method may include generating a plot of the profile, the profile may be determined and/or expressed in any other suitable manner. In this manner, the determining step may include determining a profile of cell-to-cell differences for identifying the array area edge and therefore the care area edge as described further herein. The profile may also be determined using any other results of the determining step described herein.

The method also includes determining if a repeating pattern is formed at each of the positions. For example, the method may include determining a repeating pattern profile such as repeating pattern profile 34 shown in FIG. 5. In one embodiment, determining if the repeating pattern is formed at each of the positions is performed using a pattern recognition technique. In this manner, the method may include using a pattern recognition technique to search for the "true" array area edges and therefore the care area edges in the y direction. The pattern recognition technique may include any suitable pattern recognition technique known in the art and may be performed using any suitable algorithm and/or method known in the art.

In another embodiment, determining if the repeating pattern is formed at each of the positions is performed using a template matching technique. In this manner, the method may include using template matching to identify array area edges and therefore care area edges in the y direction. As such, the method may include using pattern matching to identify "true" array area edges and care area edges in the y direction.

Pattern matching technologies have been used in many different applications. Some examples of currently available pattern matching techniques include summing of the squares of the differences (SSD), NCC, as well as feature extraction and then feature based matching. Examples of SSD methods are illustrated in U.S. Pat. Nos. 4,579,455 to Levy et al., 6,930,782 to Yi et al., and 6,947,587 to Maeda et al., which are incorporated by reference as if fully set forth herein. Examples of NCC methods are illustrated in U.S. Pat. Nos. 5,521,987 to Masaki and 6,865,288 to Shishido et al., which are incorporated by reference as if fully set forth herein. Examples of feature extraction methods are illustrated in U.S. Pat. Nos. 6,104,835 to Han, 6,650,779 to Vachtesvanos et al., 6,804,381 to Pan et al., and 6,855,381 to Okuda et al., which are incorporated by reference as if fully set forth herein. For techniques that are relatively sensitive to image brightness/contrast such as SSD, image brightness/contrast correction schemes have also been developed such as the gray level correction (GLC) method. Examples of methods that can be used for gray level correction are illustrated in U.S. Patent Application Publication No. 2005/0062963 by Yoshida et al., which is incorporated by reference as if fully set forth herein. Pattern matching used in the methods described herein may include any of the methods described in the above referenced patents and patent application publications. Such technologies have been used in inspection tools for tasks such as wafer alignment and field/die registration. The methods described herein, however, are believed to be the first applications in which pattern matching technology is used to identify edges of array areas and therefore edges of care areas for wafer inspection applications.

The method also includes identifying the position that is located closest to the inside of the array area, that has the value greater than a threshold, and at which the repeating pattern is formed as a position of the edge of the care area. In this manner, the method may include using both the difference image profile and the repeating pattern profile to determine an edge of the care area. For example, the identifying step may include using one of the difference image profiles described above to identify the array area edges and therefore the care area edges. In one such example, as shown in FIG. 5, threshold 38 may be compared to plot 36. Threshold 38 may be determined as described herein. In this manner, if the edge being identified in the method is the top edge, the identifying step may include starting from the position located closest to the inside of the array area, searching for the first jump when the profile difference is greater than the threshold. This position may be determined to be the position of the top edge of the care area.

In addition, the identifying step may include using the repeating pattern profile to identify the array area edges and therefore the care area edges by comparing threshold 32 to the repeating pattern profile. Threshold 32 may be determined as described herein. In this manner, it the edge being identified in the method is the top edge, the identifying step may include starting from the position located closest to the inside of the array area, searching for the first position when the repeating pattern profile drops below threshold 32. In this manner, the identifying step may effectively include searching for the discontinuity in the array pattern corresponding to the edge of the array area. This position determined as described above is determined to be the position of the top edge of the care area. The steps described above may be performed to determine the bottom edge of the care area.

Using the repeating pattern profile as described above may be particularly advantageous for array areas in some types of array blocks. For example, horizontal page breaks that include a pattern having about the same period as the array pattern period or no pattern may not be detected using a vertical difference image profile such as that described above. However, to determine the repeating pattern profile, a rectangle may be selected in a vertical strip, and NCC may be performed along the strip. The NCC results can be searched as described above for a position where the matching score drops below about one half the average of the matching score for the known array area.

In one embodiment, as described further above, the identifying step includes expanding the original care area in y. For example, the method may include using an array edge search algorithm to perform the steps of the method described above to identify an array area edge in the y direction and thereby to identify an edge of a care area in the y direction.

As described above, the method may include identifying a top edge of the care area. In one embodiment, therefore, the edge is a top edge of the care area. In one such embodiment, the method includes performing the determining steps and the identifying step described above to identify a bottom edge of the care area. For example, the method described above may be performed on the other side of the original care area within the difference image. In this manner, the method may include using both the difference image profile and the repeating pattern profile to determine top and bottoms edges of the care area. As such, the method may include using the array edge search algorithm to find both array area edges and therefore both edges of the care area in the y direction.

In an additional embodiment, the identifying step includes expanding the original care area in y, and the method includes expanding the original care area in x. Expanding the original care area in x and y may be performed as described herein. In some such embodiments, the method may include using the array edge search algorithm to find both array area edges and therefore both care area edges in the x and y directions.

The positions of the array area edges and therefore the care area edges in the x and y directions may be determined in inspection system coordinates. In addition, or alternatively, the positions of the array area edges and therefore the care area edges may be determined in wafer space (e.g., with reference to the wafer) in the x and y directions.

In another embodiment, all steps of the method are performed during runtime of inspection of the wafer. The steps of this method may be performed during runtime as described further herein.

In a further embodiment, the method includes performing the method for multiple array areas on the wafer on an individual array area basis. Performing the method for multiple array areas on the wafer on an individual array area basis may be performed as described further herein.

In an additional embodiment, the method includes detecting defects in the array area by performing cell-to-cell comparisons in the care area. Detecting the defects in this embodiment may be performed as described further herein.

The embodiments described above for expanding the care area for an array area in the y direction have all of the advantages of the embodiments of the method for expanding the care area for an array area in the x direction described further herein.

Each of the embodiments of the method described above may include any other step(s) of any other method(s) described herein. The embodiments of the method described above may be performed using any of the systems described herein.

An additional embodiment relates to a computer-implemented method for binning defects detected in an array area formed on a wafer. The defects may be detected as described further herein (e.g., using cell-to-cell comparisons for expanded care areas). The defects may also be detected using any of the systems described further herein. In addition, the defects may be detected during array mode inspection performed by any of the systems described herein. The defects may include any defects detected in array areas on the wafer.

This embodiment uses as an attribute for binning the distances between defect positions in array areas and array area edges, which is particularly useful for binning defects such as DOIs and nuisance defects. For example, the method includes determining distances between positions of the defects and an edge of the array area. In this manner, the method may include determining the distances of defects to array area edges for binning. The array area edges used for determining such distances are preferably the edges of the care areas determined according to any of the embodiments described herein. The distances may be determined in inspection system coordinates. In addition, or alternatively, the distances may be determined in wafer space (e.g., with reference to the wafer itself).

In one embodiment, the distances includes distances in an x direction and a y direction. For example, the method may include determining the x and y distances of the defects from the array area edges, which may be identified or found according to the embodiments described herein. In this manner, the method may include determining the x and y distances of the defects to the recorded array area edges. Such distances may be determined in any suitable manner. The method may include reporting the determined x and y distances as defect attributes.

The method also includes binning the defects in groups such that the distances determined for the defects in each of the groups are at least similar. For example, the defect attributes determined as described above may be used by a defect classifier such as iDO, which is commercially available from KLA-Tencor, San Jose, Calif., or rule-based binning (RBB) to classify the defects as either DOIs or nuisance defects. Examples of methods and systems that can be used to perform RBB are illustrated in commonly assigned U.S. Pat. No. 7,142,992 to Huet et al., which is incorporated by reference as if fully set forth herein. Examples of the iDO defect classifier are described in commonly assigned U.S. patent application Ser. Nos. 11/561,735 by Kulkarni et al., issued as U.S. Pat. No. 7,676,077 on Mar. 9, 2010, and Ser. No. 11/561,659 by Zafar et al., issued as U.S. Pat. No. 7,570,796 on Aug. 4, 2009, both of which were filed on Nov. 20, 2006, and both of which are incorporated by reference as if fully set forth herein. The embodiments described herein may include any step(s) of any method(s) described in this patent and these patent applications.

In one such embodiment, binning the defects in groups such that the distances determined for the defects in each of the groups are at least similar may include comparing the distances determined for each defect to the distances determined for other defects. The results of the comparison may be compared to one or more thresholds or a range (which may be predetermined by a user or by the computer-implemented method and which defines distances that can be considered to be at least similar), and distances that are above or below a threshold, between thresholds, within the range, etc. may be determined to be at least similar. In this manner, defects associated with distances that are determined to be at least similar may be binned in the same group.

As described above, the distances may include distances in an x direction and a y direction. In one such embodiment, the binning step includes binning the defects in the groups such that the distances in the x direction determined for the defects in each of the groups are at least similar and such that the distances in the y direction determined for the defects in each of the groups are at least similar. As such, defects located near one edge of the array area may be separated based on their positions along that edge of the array area. In this manner, binning the defects may include separating the defects located at different distances to one or more of the edges of the array areas.

In another embodiment, the method includes selecting the distances associated with each of the groups such that the binning step includes binning the defects into the groups such that each of the groups includes only nuisance defects or only defects of interest. For instance, as described above, DOI for array areas may include defects that are located relatively close to the edges of the array areas. Therefore, the distances associated with one or more of the groups may be selected to include distances that are relatively close to the array area edges. The distances associated with one or more of the groups may be selected based on, for example, the design of the array area, a priori knowledge about defects that tend to be detected in array areas, experimental results (e.g., from inspection, defect review, electrical testing, failure analysis, etc.) acquired for the array areas, information about the process or processes performed on the wafer prior to inspection, any other relevant information, or some combination thereof. In one such embodiment, binning the defects in groups such that the distances determined for the defects in each of the groups are at least similar may include comparing the distances determined for each defect to the distances associated with each group, which may be performed as described above. In this manner, DOI located relatively close to the array area edges may be separated from other DOI and/or nuisance defects that are not located relatively close to the array area edges.

Binning the defects as described above may include binning the defects using the distances determined as described above in combination with any other attributes that can be determined for the defects. Examples of attributes that can be determined for the defects and methods and systems for determining additional attributes for defects are described in commonly assigned U.S. patent application Ser. No. 11/561,735 by Kulkarni et al., issued as U.S. Pat. No. 7,676,077 on Mar. 9, 2010, and Ser. No. 11/561,659 by Zafar et al., issued as U.S. Pat. No. 7,570,796 on Aug. 4, 2009, both of which are incorporated by reference as if fully set forth herein. In some such embodiments, the defects may be binned into groups based on the distances as described above, and then the defects binned into one or more of the groups may be binned into sub-groups based on another attribute of the defects (e.g., such as size and/or shape of the defects). In this manner, different types of defects (e.g., DOI and nuisance defects, different types of DOI, different types of nuisance defects, etc.) that are located at substantially similar distances from the array area edges may be separated into different groups and/or different sub-groups.

The methods for binning the defects described above may include performing any other defect-related steps (e.g., based on the results of defect binning). For example, the method may include determining a memory repair index (MRI) for the array areas or the die in which the defects were detected. In another example, the method may include determining a yield relevancy of the defects detected in the array areas. In an additional example, the method may include monitoring and/or controlling a process that was performed on the wafer prior to defect detection based on results of the binning step. Examples of methods and systems that can be used to perform such and other defect-related steps that may be included in the binning methods described herein are described in the above-referenced patent applications by Kulkarni et al. and Zafar et al. The binning method embodiments described above may also include storing results of one or more steps of the method (e.g., results of the binning step), which may be performed as described further herein.

Each of the embodiments of the method described above may include any other step(s) of any other method(s) described herein. The embodiments of the method described above may be performed using any of the systems described herein.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. For example, after the method identifies one or more edges of a care area, the method may include recording the positions of the one or more edges of the care area. In one such example, the positions of the one or more edges of the care area may be stored in an inspection recipe that can be used to perform array mode inspection of the wafer. In one particular example, the positions of the one or more edges of the care area may be stored in a portion of the inspection recipe that includes instructions for performing array mode inspection of the wafer. In an additional example, the positions of the one or more edges of the care area may be stored in a storage medium of a wafer inspection system such that the wafer inspection system can access the care area information to perform a wafer inspection process. Furthermore, the results may be stored "permanently," "semi-permanently," temporarily, or for some period of time. For example, the storage medium may be random access memory (RAM), and the results may not necessarily persist indefinitely in the storage medium.

Figure 6:
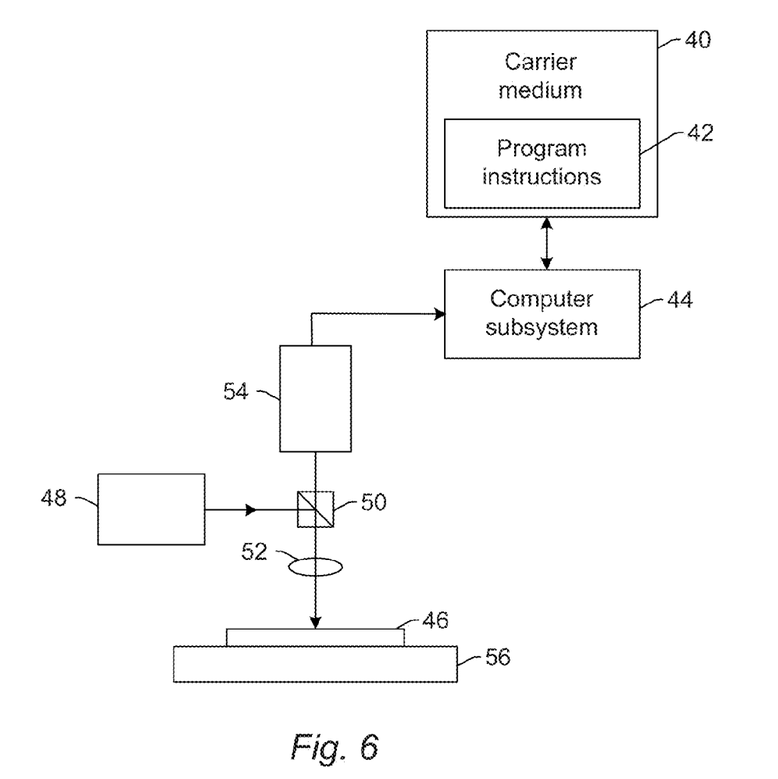
FIG. 6 is a schematic diagram illustrating a cross-sectional view of one embodiment of a carrier medium and a system configured to perform one or more of the computer-implemented methods described herein.

FIG. 6 illustrates one embodiment of carrier medium 40. Carrier medium 40 includes program instructions 42 executable on a computer system (e.g., computer subsystem 44) for performing one or more of the computer-implemented method embodiments described herein. The one or more computer-implemented methods for which the program instructions are executable may include any step(s) of any of the method(s) described herein. The step(s) of the computer-implemented method(s) for which the program instructions are executable may be performed as described further herein.

The carrier medium may be a transmission medium such as a wire, cable, or wireless transmission link. The carrier medium may also be a storage medium such as a read-only memory, a random access memory, a magnetic or image acquisition disk, or a magnetic tape.

The program instructions may be implemented in any of various ways, including procedure-based techniques, component-based techniques, and/or object-oriented techniques, among others. For example, the program instructions may be implemented using Matlab, Visual Basic, ActiveX controls, C, C++ objects, C#, JavaBeans, Microsoft Foundation Classes ("MFC"), or other technologies or methodologies, as desired.

The computer system and computer subsystem 44 may take various forms, including a personal computer system, mainframe computer system, workstation, image computer or any other device known in the art. In general, the term "computer system" may be broadly defined to encompass any device having one or more processors, which executes instructions from a memory medium.

FIG. 6 also illustrates one embodiment of a system configured to perform one or more of the computer-implemented methods described herein. The system shown in FIG. 6 includes an inspection subsystem. It is noted that FIG. 6 is provided herein to generally illustrate one embodiment of a configuration for an inspection subsystem that may be included in the system. Obviously, the system configuration described herein may be altered to optimize the performance of the system as is normally performed when designing a commercial inspection system. In addition, the systems described herein may be implemented using an existing inspection subsystem (e.g., by adding functionality described herein to an existing inspection system). For some such systems, the methods described herein may be provided as optional functionality of the system (e.g., in addition to other functionality of the system). Alternatively, the system described herein may be designed "from scratch" to provide a completely new system.

The inspection subsystem is configured to acquire one or more of the images described herein of wafer 46. The inspection subsystem includes light source 48. Light source 48 may include any appropriate tight source known in the art. Light generated by light source 48 is directed to beam splitter 50. Beam splitter 50 is configured to direct the light from light source 48 to objective 52. Beam splitter 50 may include any appropriate beam splitter known in the art. Objective 52 is configured to focus the light from beam splitter 50 to the wafer. Although objective 52 is shown in FIG. 6 as a single refractive optical element, it is to be understood that objective 52 may include one or more refractive optical elements and/or one or more reflective optical elements.

As shown in FIG. 6, the inspection subsystem is configured to illuminate the wafer by directing the light to the wafer at a substantially normal angle of incidence. However, in other embodiments (not shown), the inspection subsystem may be configured to illuminate the wafer by directing the light to the wafer at an oblique angle of incidence.

In the embodiment shown in FIG. 6, objective 52 is configured to collect light reflected from the wafer. Light collected by objective 52 passes through beam splitter 50 and is directed to detector 54 of the inspection subsystem. Detector 54 is configured to detect light transmitted by beam splitter 50. The inspection subsystem may include one or more optical components (not shown) such as a focusing or imaging lens disposed in the optical path between beam splitter 50 and detector 54. Detector 54 is configured to generate images (e.g., any of the images described herein) responsive to the light reflected from the wafer. Detector 54 may be any appropriate detector known in the art such as a charge coupled device (CCD) and a time delay integration (TDI) camera.

The inspection subsystem shown in FIG. 6 is, therefore, configured to generate images responsive to light specularly reflected from the wafer. Therefore, the inspection subsystem is configured as a bright field (BF) imaging based inspection subsystem. However, in other embodiments, the inspection subsystem may be configured as a dark field (DF) imaging based inspection subsystem. In a further embodiment, the optical inspection subsystem may be replaced by an electron beam inspection subsystem (not shown). The electron beam inspection subsystem may be configured to generate the images described herein. Examples of commercially available electron beam inspection subsystems that may be included in the system of FIG. 6 include the electron beam subsystems that are included in the eDR5000 system, the eCD-1 system, and the eS25 and eS30 systems, which are commercially available from KLA-Tencor.

The system may be configured to acquire the images in the embodiments described above manually, automatically, or semi-automatically (e.g., user-assisted). In one embodiment, the inspection subsystem may be configured to acquire the images by imaging specific areas on the wafer. For instance, the system may include computer subsystem 44, which may be configured to estimate a location of an original care area on a wafer. The computer subsystem may be configured to position the field of view of the inspection subsystem at the estimated location. Alternatively, the computer subsystem may be configured to provide the estimated location to the inspection subsystem, which may be configured to position its field of view above the estimated location. The inspection subsystem may then acquire an image at the estimated location.

Detector 54 is coupled to computer subsystem 44. Computer subsystem 44 may be coupled to detector 54 such that the computer subsystem can receive the images generated by the detector. For example, computer subsystem 44 may be coupled to the detector by a transmission medium (not shown) or an electronic component (not shown) interposed between the detector and the computer subsystem. The transmission medium and the electronic component may include any suitable such medium and component known in the art. Computer subsystem 44 may be configured to perform one or more steps of one or more methods described herein using images acquired by the inspection subsystem.

The system shown in FIG. 6 may also include carrier medium 40 and program instructions 42. The carrier medium and the program instructions may be configured as described above. In addition, the carrier medium may include program instructions executable on a computer system of any other inspection system that can be configured as described herein.

The system may also include stage 56 on which wafer 46 may be disposed during inspection. Stage 56 may include any suitable mechanical or robotic assembly known in the art. Scanning the wafer may be performed in any manner known in the art. The system shown in FIG. 6 may be further configured as described herein (e.g., according to any other embodiments described herein).

Further modifications and alternative embodiments of various aspects of the invention may be apparent to those skilled in the art in view of this description. For example, methods for identifying an edge of a care area for an array area formed on a wafer and methods for binning defects detected in an array area formed on a wafer are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for binning defects detected in an array area formed on a wafer, comprising:
   identifying an edge of a care area for the array area, wherein said identifying comprises determining a value for a difference image as a function of position from a position known to be inside the array area to a position known to be outside of the array area, determining a threshold from an average of the values for the difference image known to be inside the array area, and identifying the position that is located closest to the inside of the array area and that has the value greater than the threshold as a position of the edge of the care area;
   determining distances between positions of the defects and the edge of the array area; and
   binning the defects in groups such that the distances determined for the defects in each of the groups are at least similar, wherein said identifying, said determining, and said binning are performed using a computer system.

2. The method of claim 1, wherein the distances comprise distances in an x direction and a y direction, and wherein said binning comprises binning the defects in the groups such that the distances in the x direction determined for the defects in each of the groups are at least similar and such that the distances in the y direction determined for the defects in each of the groups are at least similar.

3. The method of claim 1, further comprising selecting the distances associated with each of the groups such that said binning comprises binning the defects into the groups such that each of the groups includes only nuisance defects or only defects of interest.

4. The method of claim 1, wherein identifying the position comprises expanding an original care area in x.

5. The method of claim 1, wherein the edge of the care area is a left edge of the care area, and wherein the method further comprises performing said determining the value and said identifying the position to identify a right edge of the care area.

6. The method of claim 1, wherein identifying the position comprises expanding an original care area in x, and wherein the method further comprises expanding the original care area in y.

7. The method of claim 1, wherein all steps of the method are performed during runtime of inspection of the wafer.

8. The method of claim 1, further comprising detecting defects in the array area by performing cell-to-cell comparisons in the care area.

9. The method of claim 1, further comprising performing said identifying the edge of the care area for multiple array areas on the wafer on an individual array area basis.

10. The method of claim 1, wherein said identifying the edge further comprises determining if a repeating pattern is formed at each of the positions and identifying the position that is located closest to the inside of the array area, that has the value greater than the threshold, and at which the repeating pattern is formed as the position of the edge of the care area.

11. The method of claim 10, wherein said identifying the position comprises expanding an original care area in y.

12. The method of claim 10, wherein the edge of the care area is a top edge of the care area, and wherein the method further comprises performing determining the value, said determining if the repeating pattern is formed at each of the positions, and said identifying the position to identify a bottom edge of the care area.

13. The method of claim 10, wherein said identifying the position comprises expanding an original care area in y, and wherein the method further comprises expanding the original care area in x.

14. The method of claim 10, wherein said determining if the repeating pattern is formed at each of the positions is performed using a pattern recognition technique.

15. The method of claim 10, wherein said determining if the repeating pattern is formed at each of the positions is performed using a template matching technique.

16. The method of claim 10, wherein all steps of the method are performed during runtime of inspection of the wafer.

17. The method of claim 10, further comprising detecting defects in the array area by performing cell-to-cell comparisons in the care area.

18. The method of claim 10, further comprising performing said identifying the edge of the care area for multiple array areas on the wafer on an individual array area basis.

19. A non-transitory computer-readable medium comprising program instructions executable on a computer system for performing a computer-implemented method for binning defects detected in an array area formed on a wafer, wherein the computer-implemented method comprises:
   identifying an edge of a care area for the array area, wherein said identifying comprises determining a value for a difference image as a function of position from a position known to be inside the array area to a position known to be outside of the array area, determining a threshold from an average of the values for the difference image known to be inside the array area, and identifying the position that is located closest to the inside of the array area and that has the value greater than the threshold as a position of the edge of the care area;

determining distances between positions of the defects and the edge of the array area; and binning the defects in groups such that the distances determined for the defects in each of the groups are at least similar.

20. A system configured to bin defects detected in an array area formed on a wafer comprising:

an inspection subsystem configured to acquire images of the wafer; and a computer subsystem configured to detect the defects in the array area formed on the wafer using the images, to identify an edge of a care area for the array area by determining a value for a difference image as a function of position from a position known to be inside the array area to a position known to be outside of the array area, determining a threshold from an average of the values for the difference image known to be inside the array area, and identifying the position that is located closest to the inside of the array area and that has the value greater than the threshold as a position of the edge of the care area, and to bin the defects detected in the array area by determining distances between positions of the defects and the edge of the array area and binning the defects in groups such that the distances determined for the defects in each of the groups are at least similar.

* * * * *